A. VANDERVELD.
CHAIN.
APPLICATION FILED JUNE 12, 1916.

1,238,847.

Patented Sept. 4, 1917.

Inventor
Anthony Vanderveld
By Moulton & Livrance
Attorneys

UNITED STATES PATENT OFFICE.

ANTHONY VANDERVELD, OF GRAND RAPIDS, MICHIGAN, ASSIGNOR TO GRAND RAPIDS SHOW CASE COMPANY, OF GRAND RAPIDS, MICHIGAN, A CORPORATION OF MICHIGAN.

CHAIN.

1,238,847.      Specification of Letters Patent.      Patented Sept. 4, 1917.

Application filed June 12, 1916. Serial No. 103,218.

*To all whom it may concern:*

Be it known that I, ANTHONY VANDERVELD, a citizen of the United States of America, residing at Grand Rapids, in the county of Kent and State of Michigan, have invented certain new and useful Improvements in Chains; and I do hereby declare the following to be a full, clear, and exact description of the invention, such as will enable others skilled in the art to which it appertains to make and use the same.

This invention relates to a chain construction and it is an object and purpose thereof to provide a chain which may be made from wire and which while of light construction, will have great durability. A further object of the invention consists in the provision of a novel construction of link adapted to be joined with other links of like structure to form a chain, the joints of the chain being of equal or greater strength than the bodies of the links. A still further object of the invention resides in the provision of a chain which may be flexible in two directions at right angles to each other so that bending of the chain in either of two planes is possible. To attain these ends as well as many others not specifically enumerated but which will appear as the description progresses, I have made the construction shown in the accompanying drawing in which:

Like reference characters refer to like parts throughout the several views of the drawings.

Figure 1:
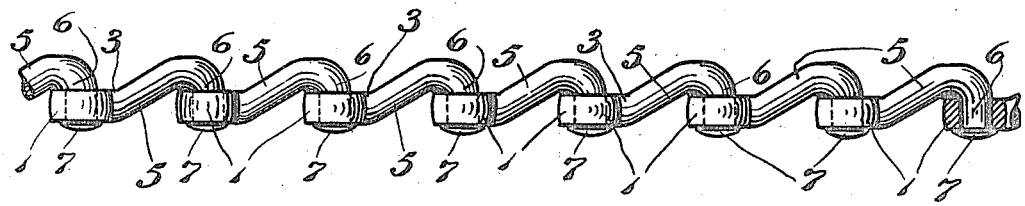
Figure 1 is an elevation of a chain comprised of a plurality of links pivotally connected together end to end.
Figure 2:
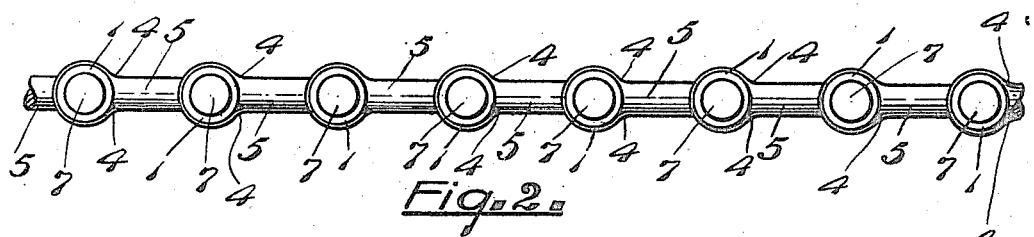
Fig. 2 is an under plan view of the chain structure shown in Fig. 1.

Each link of the chain at the one end has a head 1 of circular outline flattened at both sides through which a hole or opening 2 is made. From one side of this head a member 3 of circular cross section and having a diameter slightly less than the diameter of the opening 2 projects, there being a fillet 4 at each side at the juncture of this member 3 with a head 1 for the purpose of strengthening the construction at this point. The member 3 extends from the head 4 in the same plane therewith for a very short distance and is then bent at an angle and further extended as shown at 5, being thereafter turned to form a pintle 6 which in the construction shown in Figs. 1 and 2, has its axis parallel to the axis of the opening 2 through the head 1 of the link. The angle at which the section 5 is bent is such that the pintle 6 will just pass through the opening 2 of an adjacent link whereby the heads of the links thus connected lie in the same plane. The part 6 is riveted to produce a head 7 and thereby form an inseparable connection between the adjacent links which however allows pivotal movement of one link with respect to another.

A chain of the character described may be made of wire the heads 1 being formed in any suitable manner as by upsetting metal on one end and then flattening it to produce the head. With a plurality of links connected together all of the heads 1 lie in the same plane and any strain to which the chain may be subjected is transmitted directly through the length of the chain from the head to a pintle 6. Furthermore irrespective of how great the strain to which the chain is subjected the links do not bend at any point owing to the particular pivotal connection of the head of one link to the pintle of an adjacent link and the very short leverage or movement arm of the force tending to straighten the link at the bend between section 5 and pintle 6. Also, there being no reduction in the metal in the formation of the pintle, the joint is of maximum strength. In fact under actual breaking test the link is most liable to break at the juncture of the head with the body 3 thereof and it is to strengthen this part that fillets 4 are used.

Figure 3:
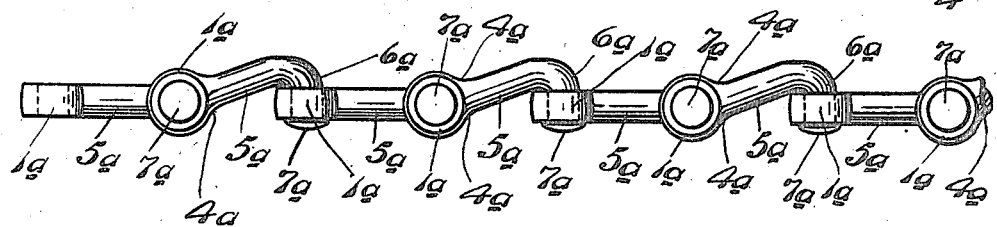
Fig. 3 is a view similar to Fig. 1, of a modified construction showing a chain in which successive links may be turned at right angles to each other.
Figure 4:
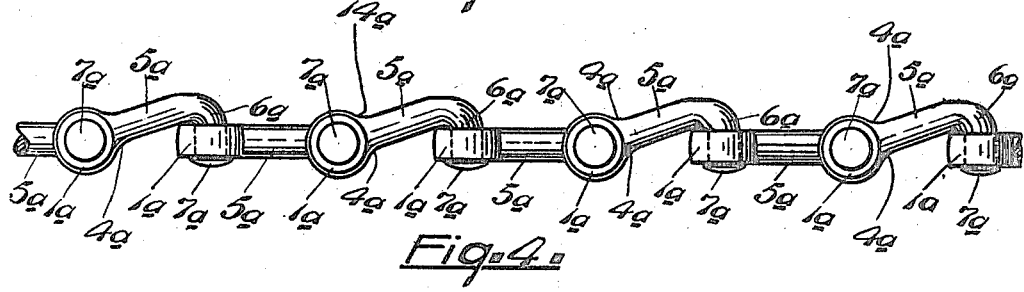
Fig. 4 is an under plan view of the chain construction shown in Fig. 3.

In Figs. 3 and 4 a slightly different construction is used the head 1ª, angular extension 5ª, fillets 4ª, pintle 6ª, and the head 7ª being similar in all respects to head 1, extension 5, fillets 4, pintle 6 and head 7 of the former construction except that the axis of a pintle 6ª is turned at right angles to the axis of the opening through the head of a link instead of lying parallel thereto.

When a plurality of links of this kind are joined together end to end a chain is made in which consecutive pintles 6ª lie at right angles to each other, permitting the bending of the chain in two different planes at right angles to each other.

Figures 5, 6:
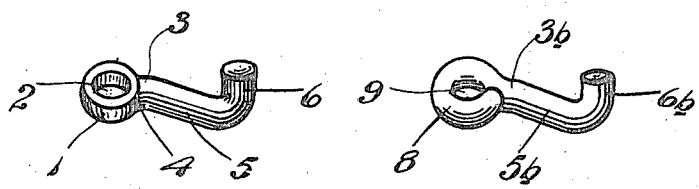
Fig. 5 is a perspective view of a chain link of the type shown in Figs. 1 and 2 and, Fig. 6 is a similar view of a slightly modified form of chain link.

In Fig. 6 I have shown a modified construction of link in which the head 8 is formed by bending one end of the wire from which the link is made into an eye leaving an opening 9 through which the pintle of an adjacent link may be inserted for connecting the links together. The body $3^b$, angular extension $5^b$ and pintle $6^b$ of this link is similar in all respects to the body 3, angular extension 5 and pintle 6 of the link shown in Fig. 5.

I claim:

In a chain, a plurality of links each formed from wire and having an enlarged head with an opening therethrough, a length of said wire extending from one side of the head and bent outwardly at an angle for a distance and then turned to form a pintle, said links being positioned end to end with the pintle at the end of one link entering the opening in the head of the adjacent link and permanently connected with said head, the pintles being located at right angles to the length of the chain and the heads parallel to the length of the chain.

In testimony whereof I affix my signature.

ANTHONY VANDERVELD.

Copies of this patent may be obtained for five cents each, by addressing the "Commissioner of Patents, Washington, D. C."